(No Model.)

M. HARDENBROOK.
HORSE HOE.

No. 307,939. Patented Nov. 11, 1884.

WITNESSES:
Chas. Nida
C. Sedgwick

INVENTOR:
M. Hardenbrook
BY Munn & Co.
ATTORNEYS.

UNITED STATES PATENT OFFICE.

MARCUS HARDENBROOK, OF MARYSVILLE, KANSAS.

HORSE-HOE.

SPECIFICATION forming part of Letters Patent No. 307,939, dated November 11, 1884.

Application filed April 2, 1884. (No model.)

*To all whom it may concern:*

Be it known that I, MARCUS HARDENBROOK, of Marysville, in the county of Marshall and State of Kansas, have invented a new and useful Improvement in Horse-Hoes, of which the following is a full, clear, and exact description.

Reference is to be had to the accompanying drawings, forming a part of this specification, in which similar letters of reference indicate corresponding parts in all the figures.

Figure 1:
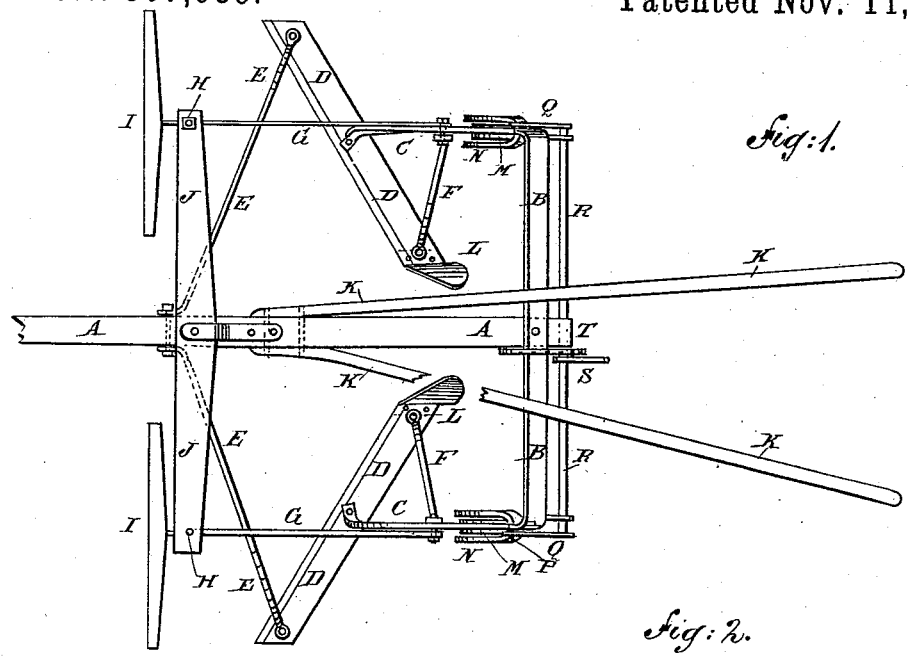
Figure 2:
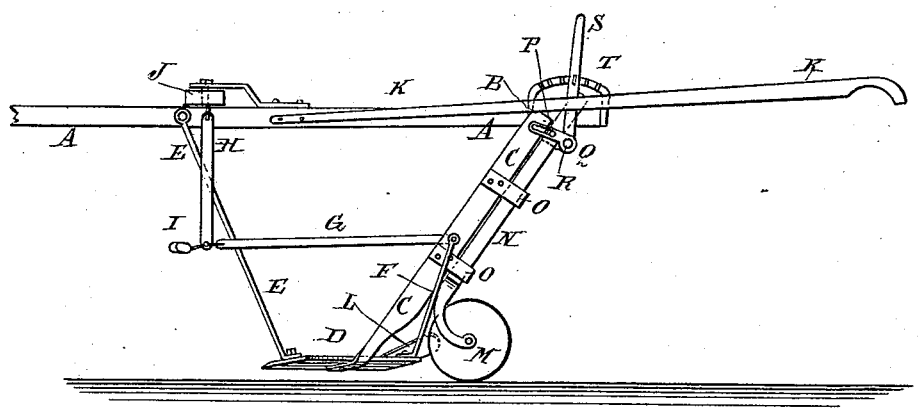
Figure 3:
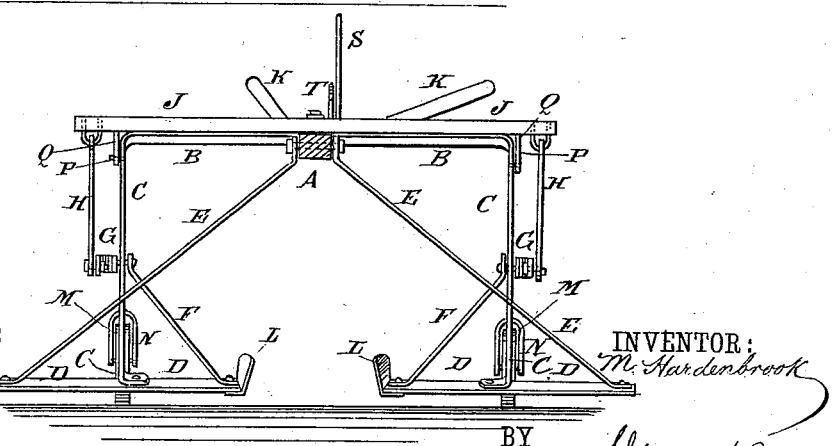

Figure 1 is a plan view of my improvement, part being broken away. Fig. 2 is a side elevation of the same. Fig. 3 is a front elevation of the same, the tongue being shown in section.

The object of this invention is to facilitate the cultivation of small plants and promote convenience in adjusting, guiding, and controlling horse-hoes.

The invention consists in a horse-hoe constructed with fenders upon the inner ends of the hoes to protect small plants from the soil thrown by the said hoes.

With the hoe-standards of the machine are connected standards having gage-wheels journaled to their lower ends, and provided at their upper ends with pins engaging with slotted arms attached to a rod rocking in supports attached to the frame of the machine and provided with a lever engaging with a catch-bar, also attached to the said frame, so that the gage-wheels and standards can be readily adjusted, and will be securely held, as will be hereinafter fully described.

A represents the tongue, to the rear part of which is attached the cross-bar B.

To the ends of the cross-bar B are attached the upper ends of the standards C, to the lower ends of which are attached the middle parts of the hoes D.

To the outer ends of the hoes D are attached the lower ends of the braces E, the upper ends of which are attached to the tongue A.

To the inner ends of the hoes D are attached the lower ends of the braces F, the upper ends of which are attached to the standards C. By this construction the hoes D will be firmly supported in place. To the standards C are also attached the rear ends of the draw-bars G, with the forward ends of which are connected the lower ends of the hanging bars H, and whiffletrees I. The upper ends of the hanging bars H are pivoted to the ends of the doubletree J, which is pivoted at its center to the tongue A. To the opposite sides of the tongue A, a little in the rear of the doubletree J, are attached the forward ends of the handles K, by means of which the machine is guided.

To the inner ends of the hoes D are attached wings, L, to serve as fenders to prevent small plants from being covered or injured by the soil thrown by the said hoes D. The fenders L are secured detachably to the hoes D by bolts or other suitable means, so that the said fenders can be readily detached when not required for use.

M are gage-wheels, which are journaled to the rearwardly bent and slotted lower ends of the standards N. The gage-wheel standards N slide up and down in keepers O, attached to the hoe-standards C. The upper parts of the gage-wheel standards N are connected by pins P with the slotted arms Q, rigidly attached to or formed upon the ends of the rod R, which rocks in bearings in supports attached to the cross-bar B, and to the rear end of the tongue A.

To the middle part of the rod R is rigidly attached a lever, S, which projects upward across a toothed catch-bar, T, so that the said lever will be held securely into any position in which it may be adjusted. The ends of the catch-bar T are bent downward, and are attached to the rear part of the tongue A. With this construction, by operating the lever S, the standards N and wheels M can be adjusted to cause the hoes D to work at any desired depth in the ground, or to raise the said hoes above the ground for convenience in turning around and in passing from place to place.

Having thus described my invention, I claim as new and desire to secure by Letters Patent—

1. The cross-bar centrally connected to the draft-beam A, and having downwardly-projecting standards or pendants, C C, about centrally connected to and in combination with the hoes D, the braces F, connected to the inner ends of the hoes and to the standards C, and the braces E, with their lower ends connected to the outer ends of the hoes and to the central draft-beam at its sides, substantially as and for the purpose set forth.

2. The cross-bar B, centrally connected to the draft-beam A, and having integrally connected therewith the downwardly-projecting standards or pendants C, about centrally connected to and in combination with the hoes D, the braces F, connecting to the inner ends of the hoes and to the standards C, the braces E, with their lower ends connected to the outer ends of the hoes and to the central draft-beam, A, the draw-bars G, having a common point of connection to the standards C, with the braces F, and the hanging bars H, substantially as and for the purpose set forth.

3. In a horse-hoe, the combination, with the hoe-standards C, the cross-bar B, and the tongue A, and the gage-wheels M and standards N, having pins P, of the rock-rod R, having slotted arms Q, and lever S, and the catch-bar T, substantially as herein shown and described, whereby the said gage-wheels and gage-wheel standards can be readily adjusted, and will be securely held, as set forth.

MARCUS HARDENBROOK.

Witnesses:
  WM. T. TATE,
  GEORGE THOMAS.